United States Patent
Saunders et al.

(10) Patent No.: US 8,418,918 B2
(45) Date of Patent: *Apr. 16, 2013

(54) SYSTEM AND METHOD FOR SECURE TRANSACTIONS MANAGEABLE BY A TRANSACTION ACCOUNT PROVIDER

(75) Inventors: Peter D. Saunders, Salt Lake City, UT (US); Brian T. Barnes, South Jordan, UT (US)

(73) Assignee: American Express Travel Related Services Company, Inc., New York, NY (US)

(*) Notice: Subject to any disclaimer, the term of this patent is extended or adjusted under 35 U.S.C. 154(b) by 87 days.

This patent is subject to a terminal disclaimer.

(21) Appl. No.: 12/354,539

(22) Filed: Jan. 15, 2009

(65) Prior Publication Data

US 2009/0125446 A1 May 14, 2009

Related U.S. Application Data

(63) Continuation of application No. 11/161,295, filed on Jul. 28, 2005, now Pat. No. 7,543,738, which is a continuation-in-part of application No. 10/708,569, filed on Mar. 11, 2004, now Pat. No. 7,542,942, which is a continuation-in-part of application No. 10/192,488, filed on Jul. 9, 2002, now Pat. No. 7,239,226, said application No. 10/708,569 is a continuation-in-part of application No. 10/340,352, filed on Jan. 10, 2003.

(60) Provisional application No. 60/304,216, filed on Jul. 10, 2001, provisional application No. 60/396,577, filed on Jul. 16, 2002.

(51) Int. Cl.
*G06K 5/00* (2006.01)
*G06K 7/01* (2006.01)

(52) U.S. Cl.
USPC .......... 235/380; 235/379; 235/383; 235/449; 235/451; 235/492; 235/493

(58) Field of Classification Search .................. 235/375, 235/379, 451, 492, 487, 380–382.5, 493; 340/5.4, 5.61, 10.1, 572.1; 705/39–45
See application file for complete search history.

(56) References Cited

U.S. PATENT DOCUMENTS 4,841,570 A 6/1989 Cooper
5,590,038 A 12/1996 Pitroda
(Continued)

OTHER PUBLICATIONS

Derfler, "How Networks Work", Bestseller, 1996, Ziff-Davis Press, Emeryville, CA, all pages.

(Continued)

*Primary Examiner* — Tuyen K Vo
(74) *Attorney, Agent, or Firm* — Snell & Wilmer L.L.P.

(57) ABSTRACT

A system and method for securing a financial transaction using a proxy code, which is assigned a transaction account number. An account issuer permanently assigns the proxy code to a transaction account correlated to the transaction device. The proxy code is uploaded onto the transaction device for later use in completing a transaction request. During transaction completion, the proxy code is provided to a merchant system in lieu of any sensitive account information. Since the proxy code is permanently assigned, the number need not be changed or updated on the merchant system once uploaded into a payment device or merchant database. The account issuer may manipulate the sensitive account information without need to alter the information stored on the merchant database. Since the proxy code contains no sensitive information, the sensitive information related to the transaction account is secured from theft.

15 Claims, 3 Drawing Sheets

U.S. PATENT DOCUMENTS

| | | | |
|---|---|---|---|
| 5,692,132 | A | 11/1997 | Hogan |
| 5,715,314 | A | 2/1998 | Payne et al. |
| 5,883,810 | A * | 3/1999 | Franklin et al. ............... 700/232 |
| 5,903,652 | A | 5/1999 | Mital |
| 6,026,166 | A | 2/2000 | LeBourgeois |
| 6,044,388 | A | 3/2000 | DeBellis et al. |
| 6,067,529 | A | 5/2000 | Ray et al. |
| 6,069,952 | A | 5/2000 | Saito et al. |
| 6,073,840 | A | 6/2000 | Marion |
| 6,078,888 | A | 6/2000 | Johnson |
| 6,101,477 | A | 8/2000 | Hohle et al. |
| 6,173,272 | B1 | 1/2001 | Thomas et al. |
| 6,185,307 | B1 | 2/2001 | Johnson |
| 6,257,486 | B1 | 7/2001 | Teicher et al. |
| 6,263,316 | B1 | 7/2001 | Khan et al. |
| 6,317,721 | B1 | 11/2001 | Hurta et al. |
| 6,317,755 | B1 | 11/2001 | Rakers et al. |
| 6,363,363 | B1 | 3/2002 | Haller et al. |
| 6,501,832 | B1 | 12/2002 | Saylor et al. |
| 6,529,880 | B1 | 3/2003 | McKeen et al. |
| 6,641,050 | B2 * | 11/2003 | Kelley et al. ................... 235/492 |
| 6,675,153 | B1 | 1/2004 | Cook et al. |
| 6,725,202 | B1 | 4/2004 | Hurta et al. |
| 6,771,981 | B1 | 8/2004 | Zalewski et al. |
| 6,857,566 | B2 | 2/2005 | Wankmueller |
| 6,925,565 | B2 | 8/2005 | Black |
| 6,957,199 | B1 | 10/2005 | Fisher |
| 6,968,317 | B1 | 11/2005 | Wallace et al. |
| 7,003,501 | B2 | 2/2006 | Ostroff |
| 7,020,685 | B1 | 3/2006 | Chen et al. |
| 7,213,748 | B2 | 5/2007 | Tsuei et al. |
| 7,237,121 | B2 | 6/2007 | Cammack et al. |
| 7,254,557 | B1 * | 8/2007 | Gillin et al. ...................... 705/40 |
| 7,287,695 | B2 | 10/2007 | Wankmueller |
| 7,340,438 | B2 | 3/2008 | Nordman et al. |
| 7,363,505 | B2 | 4/2008 | Black |
| 7,419,093 | B1 | 9/2008 | Blackson et al. |
| 2002/0002468 | A1 | 1/2002 | Spagna et al. |
| 2002/0043566 | A1 | 4/2002 | Goodman et al. |
| 2002/0095298 | A1 | 7/2002 | Ewing |
| 2002/0107791 | A1 | 8/2002 | Nobrega et al. |
| 2002/0107798 | A1 | 8/2002 | Hameau et al. |
| 2002/0111919 | A1 | 8/2002 | Weller et al. |
| 2003/0005310 | A1 | 1/2003 | Shinzaki |
| 2003/0149662 | A1 | 8/2003 | Shore |
| 2004/0010462 | A1 * | 1/2004 | Moon et al. ...................... 705/39 |
| 2004/0044627 | A1 | 3/2004 | Russell et al. |
| 2004/0236819 | A1 | 11/2004 | Anati et al. |
| 2005/0033659 | A1 | 2/2005 | Zucker et al. |
| 2005/0033688 | A1 | 2/2005 | Pert et al. |
| 2005/0065872 | A1 | 3/2005 | Moebs et al. |
| 2005/0071231 | A1 | 3/2005 | Beenau et al. |
| 2005/0223230 | A1 | 10/2005 | Zick |
| 2006/0178937 | A1 * | 8/2006 | Rau et al. ........................ 705/18 |

OTHER PUBLICATIONS

White, "How Computers Work", Millennium Edition, 1999, Que Corporation, Indianapolis, IN, all pages.
Gralla, "How the Internet Works", Millennium Edition, 1999, Que Corporation, Indianapolis, IN, all pages.
Muller, "Desktop Encyclopedia of the Internet", 1999, Artech House Inc., Norwood, MA. All pages.
"The Bank Credit Card Business", American Bankers Association, 1996, all pages.
Menezes, et al., "The Handbook of Applied Cryptography", 1997, CRC Press, Chapter 10.
Final Office Action issued Feb. 6, 2009 in U.S. Appl. No. 11/306,617.
Non-Final Office Action issued Aug. 4, 2008 in U.S. Appl. No. 11/306,617.
ISR dated May 22, 2008 in PCT/US06/045362.
Written Opinion issued Jul. 9, 2008 in PCT/US06/045362.
ISR/WO dated Jul. 9, 2008 for PCT/US06/45362.
Notice of Allowance issued Mar. 3, 2009 in U.S. Appl. No. 11/161,295.
Non-Final Office Action issued Mar. 19, 2008 in U.S. Appl. No. 11/164,609.
Notice of Allowance issued Jul. 3, 2008 in U.S. Appl. No. 11/161,105.
Requirement for Restriction issued Jan. 12, 2009 in U.S. Appl. No. 11/552,886.
Non-Final Office Action issued Apr. 11, 2008 in U.S. Appl. No. 11/552,886.
Final Office Action issued Aug. 6, 2008 in U.S. Appl. No. 11/552,886.
Advisory Action issued Sep. 18, 2008 in U.S. Appl. No. 11/552,886.
USPTO; Advisory Action dated Jan. 30, 2009 in U.S. Appl. No. 11/161,295.
USPTO; Final Office Action dated Nov. 10, 2008 in U.S. Appl. No. 11/161,295.
USPTO; Office Action dated Jun. 24, 2008 in U.S. Appl. No. 11/161,295.
USPTO; Notice of Allowance dated May 25, 2010 in U.S. Appl. No. 10/810,473.
USPTO; Office Action dated Oct. 15, 2009 in U.S. Appl. No. 10/810,473.
USPTO; Advisory Action dated Mar. 18, 2009 in U.S. Appl. No. 10/810,473.
USPTO; Final Office Action dated Dec. 10, 2008 in U.S. Appl. No. 10/810,473.
USPTO; Office Action dated Apr. 1, 2008 in U.S. Appl. No. 10/810,473.

* cited by examiner

| ACCOUNT NUMBER and PROXY CODE | | ACCOUNT HOLDER PERSONAL INFORMATION | | | | SETTLEMENT INFORMATION |
|---|---|---|---|---|---|---|
| Proxy Code | Account Number | Name | Address/Phone Number | Upper Limit | Balance | Restriction Codes / Settlement Agency |
| 3508644444444449 | 370048693501255 | Johnetta Smith | 111 Hazelbrook Fremont, CA 94583 (510) 555-5555 | $5,000 | $1,536.06 | G1, L2, H9 / AEXP |
| 3507955555555559 | 370048655346465 | John Q. Public | 999 S. Harding Springfield, OH 45506 (937) 555-5555 | $10,000 | $7,636.04 | A1, C2, J9 VISA |

SYSTEM AND METHOD FOR SECURE TRANSACTIONS MANAGEABLE BY A TRANSACTION ACCOUNT PROVIDER

RELATED APPLICATIONS

This application is a continuation of, and claims priority to, U.S. Ser. No. 11/161,295, entitled "SYSTEM AND METHOD FOR SECURE TRANSACTIONS MANAGEABLE BY A TRANSACTION ACCOUNT PROVIDER", filed Jul. 28, 2005. The '295 application is a continuation-in-part of, and claims priority to U.S. Ser. No. 10/708,569, entitled "SYSTEM AND METHOD FOR SECURING SENSITIVE INFORMATION DURING COMPLETION OF A TRANSACTION," filed Mar. 11, 2004. The '569 application is a continuation-in-part of, and claims priority to U.S. Pat. No. 7,239,226, entitled "SYSTEM AND METHOD FOR PAYMENT USING RADIO FREQUENCY IDENTIFICATION IN CONTACT AND CONTACTLESS TRANSACTIONS," issued on Jul. 3, 2007 (aka U.S. Ser. No. 10/192,488, entitled "SYSTEM AND METHOD FOR PAYMENT USING RADIO FREQUENCY IDENTIFICATION IN CONTACT AND CONTACTLESS TRANSACTIONS," filed Jul. 9, 2002) (which itself claims priority to U.S. Provisional Patent Application No. 60/304,216, filed Jul. 10, 2001). The '569 application is also a continuation-in-part of, and claims priority to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002). All of which are incorporated herein by reference.

FIELD OF INVENTION

This invention generally relates to securing a financial transaction. More particularly, the invention pertains to a system and method for securing the transaction using a proxy code or number which hides the underlying sensitive payment device information from the merchant system and which permits the account provider to manage the sensitive information without need to alter the proxy code.

BACKGROUND OF THE INVENTION

Like barcode and voice data entry, RFID is a contactless information acquisition technology. RFID systems are wireless, and are usually extremely effective in hostile environments where conventional acquisition methods often fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a fob or tag for use in completing financial transactions. A typical RFID fob is ordinarily a self-contained device, which may take the shape of any portable form factor. The RFID fob may include a transponder for transmitting information during a transaction. In some instances, a battery may be included in the fob to power the transponder, in which case the internal circuitry of the fob (including the transponder) may draw its operating power from the battery power source. Alternatively, the fob may gain its operating power directly from an RF interrogation signal.

U.S. Pat. No. 5,053,774, issued to Schuermann, describes a typical transponder RF interrogation system which may be found in the prior art. The Schuermann patent generally describes the powering technology surrounding conventional transponder structures. U.S. Pat. No. 4,739,328 discusses a method by which a conventional transponder may respond to an RF interrogation signal. Other typical modulation techniques which may be used include, for example, ISO/IEC 14443 and the like.

In the conventional fob powering technologies used, the fob is typically activated upon presenting the fob into an interrogation signal. In this regard, the fob may be activated irrespective of whether the user desires such activation. Alternatively, the fob may have an internal power source such that interrogation by the reader for activation of the fob is not required.

One of the more visible uses of the RFID technology is the introduction of Exxon/Mobil's Speedpass® and Shell's EasyPay® products. These products use transponders, placed in a fob or tag, which enable automatic identification of the user when the fob is presented at a merchant's Point-of-Sale (POS) device, for example, when attempting to complete a transaction. During the transaction completion, a fob identifier is passed from the RFID fob to the POS, which delivers the information to a merchant system for transaction completion.

To complete the transaction, the merchant system may typically pass the fob identifier to a third-party server database. The third-party server may reference the identification data to a customer (e.g., user) credit or debit account. In an exemplary processing method, the third-party server may seek authorization for the transaction by passing the transaction and account data to an authorizing entity, such as for example an "acquirer" or account issuer. Once the server receives authorization from the authorizing entity, the authorizing entity sends clearance to the POS device for transaction completion.

In addition to sending the information to an issuer system for authorization, the merchant system may store information related to the fob (e.g., fob identifier authorization) in a merchant system database for later reference. For example, where the transaction device user is a repeat customer, the transaction device user may wish to complete the transaction using transaction account information previously submitted to the merchant system. Since the account information is stored on the merchant system, the user need not provide the information to a merchant to complete subsequent transactions. Instead, the user may indicate to the merchant to use the transaction account information stored on the merchant system for transaction completion.

In another typical example, the merchant system may store the transaction account information for later reference when the transaction device user establishes a "recurring billing" account. In this instance, the merchant may periodically charge a user for services rendered or goods purchased. The user may authorize the merchant system to seek satisfaction of the charge using the transaction account information stored in the merchant system. The merchant may thereby send a transaction request regarding the charge to an account provider, or a third-party server for transaction authorization and satisfaction.

Because RFID transactions involve passing transaction account information from the RFID transaction device to a merchant in a contactless environment, the account information is susceptible to being intercepted by an unauthorized receiver and used for fraudulent transactions. To lessen the occurrence of fraudulent transactions in the RFID environment, RFID transaction device issuers have focused much effort on securing the information passed in RFID transactions. Many of the efforts have focused on securing the transaction account or related data during transmission from the user to the merchant, or from the merchant to a third-party server or account issuer system. For example, one conventional method for securing RFID transactions involves requiring the device user to provide a secondary form of identification during transaction completion. The RFID transaction device user may be asked to enter a personal identification number (PIN) into a keypad. The PIN may then be verified against a number associated with the user or the RFID transaction device, wherein the associated number is stored in an account issuer database. If the PIN number provided by the device user matches the associated number, then the transaction may be cleared for completion. In this way, the merchant (and account issuer) is relatively assured that the transaction device user or the account information passed to the merchant is valid.

Although current methods are useful in authorizing the information provided to the merchant, one problem with the conventional efforts is that they typically do not focus on the ways to secure the transaction account information after the information is received by and stored on the merchant system. As noted, the merchant may typically store on a merchant database the information received from the transaction device during a transaction. Such information may be sensitive information concerning the fob user or the transaction device user's account. Should the transaction device user's sensitive information be retrieved from the merchant system without authorization, the user or account issuer may be subjected to fraudulent activity. More importantly, the account issuer's ability to secure the sensitive information while it is stored on the merchant system is limited by the merchant's security measures used in securing its merchant system database. Consequently, the account issuer often has little influence over the security of the account information once the information is provided to the merchant system.

As such, a need exists for a method which permits the account issuer to have a significant influence on the security of the transaction account information stored on a merchant system. A suitable system may allow an account issuer to manage the transaction account information while leaving the information stored on the merchant system in tact.

SUMMARY OF THE INVENTION

A system and method for securing transactions is described which addresses the problems found in conventional transaction securing methods. In one aspect of the invention, the securing method described herein includes providing a proxy code to a merchant system during a transaction instead of providing sensitive transaction account information. A transaction device in accordance with the invention provides the proxy code to the merchant system contemporaneously with a transaction request. The merchant system may receive the proxy code and correlate the proxy code to a user or transaction in the merchant system. The merchant system may store the proxy code in a merchant database for later reference.

The proxy code does not include any sensitive information about the transaction device user or user transaction account. Instead the merchant system receives a proxy code, which takes the place of the sensitive information ordinarily received during transaction completion. In other words, certain information such as the user's actual account number is never transmitted to the merchant. Thus, the user's account number is not available should the merchant system be compromised.

In accordance with another aspect of the invention, the account issuer correlates the proxy code to an underlying account number on an account issuer database. The account number may ordinarily have the account holder's sensitive information associated with it. The account number may be completely managed by the account issuer. For example, the account issuer may change the account number associated with the proxy code, without changing the proxy code itself. In this way, the account holder may alter the account number, or any sensitive information related thereto, without changing the proxy code, so that the proxy code need not be replaced on the merchant system. Indeed, the merchant system is ordinarily not aware of the changes made by the account issuer.

In accordance with yet another aspect of the invention, a radio frequency identification (RFID) transaction device is used to complete a transaction. The RFID transaction device may be interrogated by an RFID reader operable to provide an RF interrogation signal for powering a transponder system. The RFID reader may receive the proxy code instead of sensitive transaction device information, and the merchant may receive the transaction device proxy code from the RFID transaction device and provide the proxy code to an authorizing agent, such as an acquirer or an account issuer, for verification. For example, the authorizing agent may verify that the proxy code corresponds to a valid transaction account on the account issuer system. The authorizing agent may use the proxy code to locate the appropriate verifying (i.e., "validating") information for confirming the transaction account validity. Once the authorizing agent verifies the validity of the transaction account using the proxy code, the authorizing entity (e.g., account issuer or acquirer) may provide authorization to the merchant that a transaction may be completed.

In one exemplary embodiment, the RFID reader may additionally be validated. In this instance, the RFID reader may be provided an RFID reader authentication tag which may be used to validate the reader. During a transaction completion, the RFID reader receives the RFID transaction device proxy code, and the reader may provide the transaction device proxy code and the reader authentication tag to an authorizing agent, such as an acquirer. In a similar manner as with the transaction account, the acquirer may then validate that the RFID reader is an authorized reader for facilitating an RF transaction with the account issuer. If the RFID reader is validated, the acquirer may then provide the RFID transaction device identifier to an account issuer for RFID device verification. The account issuer may then verify that the RFID transaction device is authorized to complete the requested transaction. Alternatively, the reader may be directly validated by the account issuer.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings.

DETAILED DESCRIPTION

The present invention may be described herein in terms of functional block components, screen shots, optional selections and various processing steps. Such functional blocks may be realized by any number of hardware and/or software components configured to perform the specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, encryption and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

The exemplary network disclosed herein may include any system for exchanging data or transacting business, such as the Internet, an intranet, an extranet, WAN, LAN, satellite communications, and/or the like. It is noted that the network may be implemented as other types of networks, such as an interactive television network (ITN). Further still, the terms "Internet" or "network" may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein. For further information regarding such details, see, for example, Dilip Naik, Internet Standards and Protocols (1998); Java 2 Complete, various authors, (Sybex 1999); Deborah Ray and Eric Ray, Mastering HTML 4.0 (1997); Loshin, TCP/IP Clearly Explained (1997). All of these texts are hereby incorporated by reference.

By communicating, a signal may travel to/from one component to another. The components may be directly connected to each other or may be connected through one or more other devices or components. The various coupling components for the devices can include but are not limited to the Internet, a wireless network, a conventional wire cable, an optical cable or connection through air, water, or any other medium that conducts signals, and any other coupling device or medium.

Where required, the system user may interact with the system via any input device such as, a keypad, keyboard, mouse, biometric device, kiosk, personal digital assistant, handheld computer (e.g., Palm Pilot®, Blackberry®), cellular phone and/or the like. Similarly, the invention could be used in conjunction with any type of personal computer, network computer, work station, minicomputer, mainframe, or the like, running any operating system such as any version of Windows, Windows NT, Windows 2000, Windows 98, Windows 95, MacOS, OS/2, BeOS, Linux, UNIX, Solaris, or the like. Moreover, it should be understood that the invention could be implemented using TCP/IP communications protocol, SNA, IPX, Appletalk, IPte, NetBIOS, OSI or any number of communications protocols. Moreover, the transactions discussed herein may include or result in the use, sale, or distribution of any goods, services or information over any network having similar functionality described herein.

A variety of conventional communications media and protocols may be used for data links providing physical connections between the various system components. For example, the data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system including a merchant point-of-sale (POS) device and host network may reside on a local area network, which interfaces to a remote network for remote authorization of an intended transaction. The POS may communicate with the remote network via a leased line, such as a T1, D3 line, or the like. Such communications lines are described in a variety of texts, such as, "Understanding Data Communications," by Gilbert Held, which is incorporated herein by reference.

A transaction device identifier, as used herein, may include any identifier for a transaction device, such as, for example, any hardware, software, code, number, letter, symbol, digital certificate, smart chip, digital signal, analog signal, biometric and/or other identifier/indicia. The device identifier may also be correlated to a user transaction account (e.g., credit, charge debit, checking, savings, reward, loyalty, or the like) maintained by a transaction account provider (e.g., payment authorization center). A typical transaction account identifier distinct to a transaction device, may be correlated to a transaction account number associated with a credit or debit account, loyalty account, or rewards account maintained and serviced by such entities as American Express®, Visa®, MasterCard®) or the like.

A transaction device identifier or account number may be, for example, a sixteen-digit or nineteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000." In a typical example, the first five to seven digits are reserved for processing purposes and identify the issuing bank, card type and, etc. In this example, the last sixteenth digit is used as a sum check for the sixteen-digit number. The intermediary eight-to-ten digits are used to uniquely identify the customer. The account number transaction device may be stored as Track 1 and Track 2 data as defined in ISO/IEC 7813, and further may be created unique to the RFID transaction device. The account number or transaction device may be communicated in Track 1 and Track 2 data, as well.

In one exemplary embodiment of the invention, the transaction device may be correlated with a unique RFID transaction device account number maintained on an account issuer database. In accordance with the invention, the account number is not provided to a merchant during transaction completion. Instead, the merchant system may be provided a "proxy code" (described below). The transaction device proxy code may be stored in a transaction device database located on the transaction device. The transaction device database may be configured to store multiple proxy codes issued to the RFID transaction device user by the same or different account issuing institutions.

To facilitate understanding, the present invention may be described with respect to a credit account. However, it should be noted that the invention is not so limited. Other accounts which facilitate an exchange of goods or services are contemplated to be within the scope of the present invention.

The databases discussed herein may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuer. Each of these three exemplary data sets may contain different information that is stored using different data storage formats and/or techniques. Further, each data set may contain subsets of data which also may be distinct from other subsets.

In addition to the above, the transaction device identifier may be associated with any secondary form of identification configured to allow the consumer to interact or communicate with a payment system. For example, the transaction device identifier may be associated with, for example, an authorization/access code, personal identification number (PIN), Internet code, digital certificate, biometric data, and/or other secondary identification data used to verify a transaction device user identity.

It should be further noted that conventional components of RFID transaction devices may not be discussed herein for brevity. For example, one skilled in the art will appreciate that the RFID transaction device and the RFID reader disclosed herein include traditional transponders, antennas, protocol sequence controllers, modulators/demodulators and the like, necessary for proper RFID data transmission. A suitable RFID transaction device and RFID reader which may be used with this invention are disclosed in U.S. patent application Ser. No. 10/192,488, filed Jul. 9, 2002. As such, those components are contemplated to be included in the scope of the invention.

Various components may be described herein in terms of their "validity." In this context, a "valid" component is one that is partially or fully authorized for use in completing a transaction request in accordance with the present invention. In contrast, an "invalid" component is one that is not partially or fully authorized for transaction completion.

Although the present invention is described with respect to validating a transaction device or reader communicating in an RF transaction, the invention is not so limited. The present invention may be used for any device, machine, or article which provides user identifying data to a merchant. Thus, the present invention may be used in any contact or contactless environment where identifying data is transferred to a merchant.

During a conventional RFID transaction, an RFID transaction device user may transmit information concerning the user's transaction account to a merchant POS. The information received by the POS may include, for example, the transaction device identifier or account number. The information may further include personal, demographic, biometric or statistical information related to the transaction device user. Upon receiving the information, the merchant POS ordinarily provides the information to a merchant system. The merchant system may store the information in a merchant system database for later reference. For example, the merchant system may later reference the transaction device information in the event that a user wishes to complete a transaction using the same identifying information as the merchant has stored on the merchant system.

In most instances, the transaction device information is stored on the merchant system database for an extended period of time. The extended storage is often because the merchant typically may wish to have the information readily available for later reference (e.g., transaction request maintenance, account or transaction request tracking, or the like). The merchant may also desire to archive the transaction device information for later use in preparing promotional offers or solicitations or materials to be provided to the transaction device user.

One key disadvantage of the conventional transaction processing method described above is that the information stored by the merchant is typically "sensitive information." Sensitive information is that information which the transaction account issuer or the transaction device user would want to guard from theft and which may be used to conduct a fraudulent transaction. Sensitive information may include any information or data. For example, sensitive information may include the user account number, transaction device identifier, transaction device user personal data or the like.

It is important to secure the sensitive information. It may be used, for example, to complete a fraudulent transaction if reproduced without authorization. For example, should an unscrupulous person gain access to the merchant system and steal the transaction device identifier or account number, the person may be able to use the stolen information to place fraudulent charges on the associated transaction account. As such, the merchant may put into place special security measures designed to protect the sensitive information from theft.

The merchant ordinarily makes decisions related to securing the sensitive information without consulting the account issuer. As such, the transaction account issuer often must rely on the effectiveness of the merchant security measures to ensure that the information is not stolen while being stored on the merchant database. If the merchant security methods are ineffective or easily compromised, the sensitive information may be easily stolen.

Figure 1:
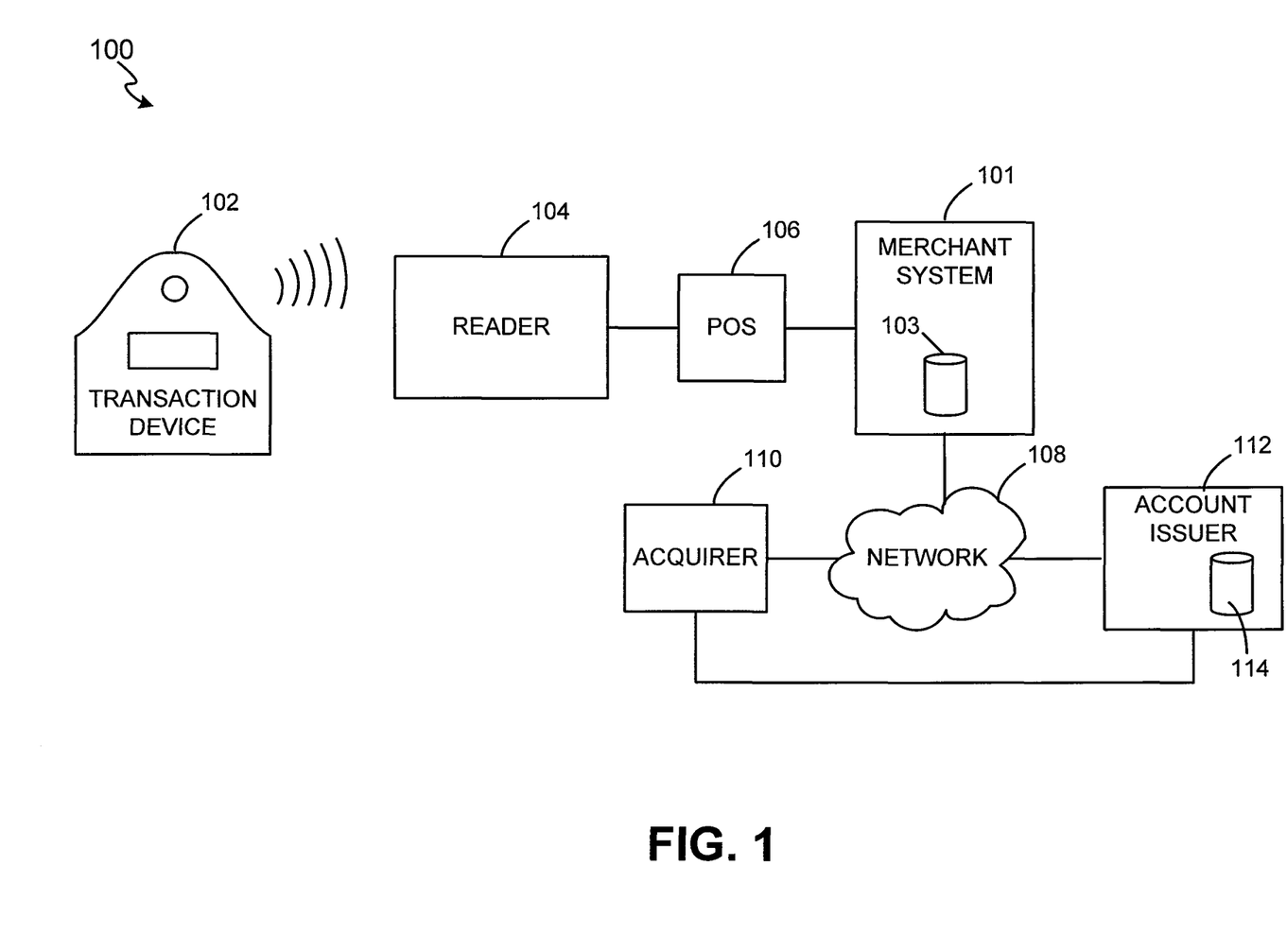
FIG. 1 illustrates an exemplary RFID transaction system depicting components for use in a secure RFID transaction completed in accordance with one embodiment of the present invention.

FIG. 1 illustrates an exemplary RFID transaction system 100, wherein exemplary components for use in completing an RF transaction are depicted. In general, system 100 may include an RFID transaction device 102 in RF communication with an RFID reader 104 for transmitting data therebetween. RFID reader 104 may be in further communication with a merchant point-of-sale (POS) device 106 for providing to POS 106 information received from the RFID transaction device 102. POS 106 may be in further communication with a merchant system 101, which may include a merchant database 103 for storing the transaction device 102 data. Merchant system 101 may be in communication with an acquirer 110 or an account issuer 112 via a network 108 for transmitting transaction request data and receiving authorization concerning transaction completion. Account issuer system 112 may further include a database 114 for storing transaction device 102 user sensitive information.

Although the POS 106 is described herein with respect to a merchant POS device, the invention is not to be so limited. Indeed, a merchant POS device is used herein by way of example, and the POS device may be any device capable of receiving transaction device account information from transaction device 102. In this regard, the POS 106 may be any point-of-interaction device, such as, for example, a merchant terminal, kiosk, user terminal, computer terminal, input/output receiver or reader, etc., enabling the user to complete a transaction using a contact or contactless transaction device 102. POS device 106 may receive RFID transaction device 102 information and provide the information to a merchant system 101 for processing.

As used herein, an "acquirer" may be any databases and processors (e.g., operated by a third party) for facilitating the routing of a payment request to an appropriate account issuer 112. Acquirer 110 may route the payment request to account issuer 112 in accordance with a routing number, wherein the routing number corresponds to account issuer 112. The routing number may be populated onto a database within transaction device 102, and RFID transaction device 102 may then provide the routing number to reader 104 during transaction completion. The "routing number" in this context may be a unique network address or any similar device for locating account issuer 112 on a network 108. In one exemplary embodiment, transaction device 102 information may be provided in magnetic stripe format and the routing number may typically be stored on one of the "tracks" comprising a magnetic stripe network. For example, the proxy code in accordance with the present invention (described below) may be provided in traditional ISO magnetic stripe format (e.g., Track 1/Track 2 format). The routing number may be typically stored in Track 1/Track 2 format of the proxy code so that the information may be interpreted by POS device 106 and merchant system 101. Traditional means of routing the payment request in accordance with the routing number are well understood. As such, the process for using a routing number to provide a payment request will not be discussed herein.

In addition, account issuer 112 (or account provider) may be any entity which provides a transaction account useful for facilitating completion of a transaction request. The transaction account may be any account such as a credit, debit, loyalty, direct debit, checking, savings, or the like. The term "issuer" or "account provider" may refer to any entity facilitating payment of a transaction using a transaction device, and which may include systems permitting payment using at least one of a preloaded and non-preloaded transaction device. Typical account issuers may be American Express, MasterCard, Visa, Discover, and the like.

In general, during operation of system 100, RFID reader 104 may provide an interrogation signal to transaction device 102 for powering device 102 and receiving transaction device 102 related information. The interrogation signal may be received at a transaction device antenna and may be further provided to a transaction device transponder. In response, a transaction device processor may retrieve transaction device information from a transaction device database for providing to RFID reader 104 to complete a transaction request. Typically, where transaction device 102 information includes a transaction device authentication tag, the tag may be encrypted prior to providing the information to reader 104.

It should be noted that RFID reader 104 and RFID transaction device 102 may engage in mutual authentication prior to transferring any transaction device 102 data to reader 104. For a detailed explanation of a suitable mutual authentication process and suitable RFID transaction device and reader for use with the invention, see commonly owned U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003, incorporated by reference in its entirety.

Once RFID reader 104 receives transaction device 102 information, reader 104 provides the information to the merchant POS 106 which provides the information to merchant system 101. Merchant system 101 may then append the transaction device information with transaction request data (e.g., any information relevant to the transaction for transaction satisfaction) and provide the entire transaction request (i.e., transaction request data and transaction device information) to acquirer 110 or issuer 112 for transaction completion. The transaction information may include a product or merchant location identifier, as well as the terms for satisfying the transaction (e.g., price to be paid, barter points to be traded, loyalty points to be redeemed). The transmitting of the information from transaction device 102 to acquirer 110 or issuer 112 may be accomplished in accordance with any conventional method for completing a transaction using contact and wireless data transmission. Acquirer 110 or issuer 112 may then determine whether to authorize completion of the transaction request in accordance with any "business as usual" protocol.

In addition to appending transaction device 102 information to the transaction request data for transaction authorization, conventional merchant systems 101 may also store transaction device 102 information in a merchant system database 103 for later reference. For example, a particular merchant may want to provide special advertisements to the user of transaction device 102 based on the user's prior purchases at the merchant location. Merchant system 101 may then recall transaction device 102 information from merchant database 103 and use the information to prepare, for example, a repeat customer mailing list. In some cases, however, merchant system 101 often also stores sensitive information related to the user such as, for example, the user's account number (e.g., credit card number) associated with transaction device 102. This sort of information is typically very easy to use in fraudulent transactions and therefore must be secured from theft. As such, conventional merchant systems use special security methods to safeguard the sensitive information from theft while the information is stored on the merchant system.

Figure 2:
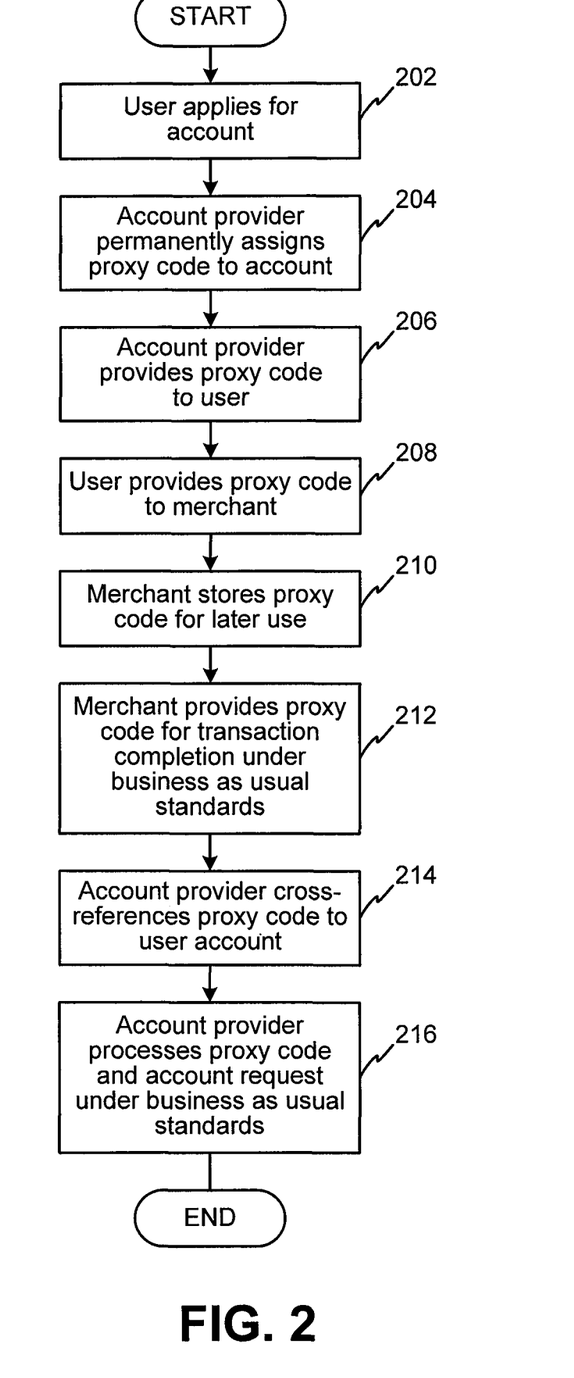
FIG. 2 depicts an exemplary flowchart of an overview of a exemplary method for securing an RFID transaction in accordance with one embodiment of the present invention; and, FIG. 3 depicts an exemplary account issuer database structure for storing the proxy code correlative to a related transaction account number in accordance with one embodiment of the present invention.

The present system and method permits the account issuer to control the level of security with which the information stored on merchant database 103 is protected. An exemplary method in accordance with the present invention may be understood with reference to system 100 on FIG. 1, the issuer database structure of FIG. 3, and the method illustrated in FIG. 2. In accordance with the invention, an account issuer 112 provides a transaction account to a transaction device user for completing a transaction. The user may receive the transaction account after the user provides information concerning the user to an account issuer system 112. For example, the user may complete an application for a credit card, and the credit card issuer may provide a credit transaction account to the user for transaction completion (step 202). The account issuer may then permanently assign a proxy code 310 (illustrated in FIG. 3) to the transaction account, so that proxy code 310 need never be altered or modified during the life of the transaction account (step 204). Account issuer 112 may assign a transaction account number 312 to the transaction account for tracking purposes. The account issuer system 112 may store proxy code 310 correlative to the related transaction account number 312 in issuer database 114. The account issuer may store proxy code 310 and account number 312 in a relational database structure 300 (for example, database system 112), so that account issuer system 112 can locate the transaction account by referencing the associated permanently assigned proxy code 310 to the related account number 312.

Figure 3:
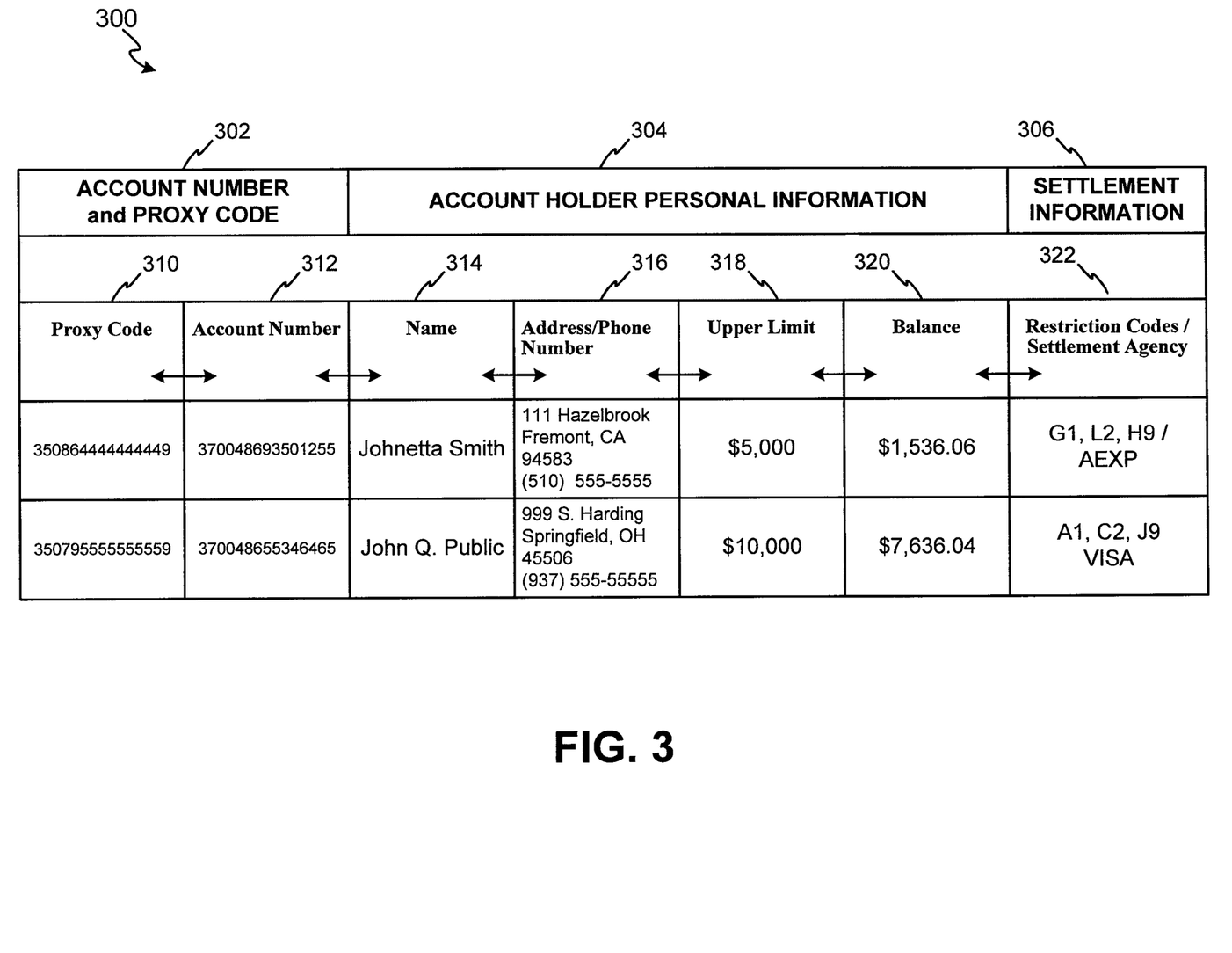

Account issuer system 112 may then provide proxy code 310 to the user, by embodying proxy code 310 in any presentable form factor such as a credit card, charge card, debit card, calling card, loyalty card, key fob, cell phone, key ring, ring, or the like (step 206). The user may then provide proxy code 310 to merchant system 101 during the completion of a transaction request (step 208). The manner in which the user provides the transaction account proxy code 310 to merchant system 101 may vary in accordance with the form factor in which proxy code 310 is embodied. For example, where proxy code 310 is embodied in the magnetic stripe of a conventional transaction card, the user may provide proxy code 310 to the merchant by "swiping" the magnetic stripe of the credit card at a suitable reader as is found in the prior art. Alternatively, proxy code 310 may be embodied in a transponder system associated with a key fob (e.g., transaction device 102). In this instance, the user may provide proxy code 310 to the merchant system by waiving the fob transaction device 102 in proximity to a suitable transponder reader (e.g., RFID reader 104). Reader 104 may provide an interrogation signal to transaction device 102 to facilitate operation of transaction device 102 and transaction device 102 may provide proxy code 310 to merchant system 101 for processing.

Merchant system 101 may receive proxy code 310 and store it in a merchant system database 103 for later reference (step 210). For example, where the user requests that merchant system 101 store proxy code 310 in reference to a recurring billing account for payment, merchant system 101 may store proxy code 310 relative to the recurring billing account and periodically use proxy code 310 to seek payment for recurring services provided by merchant system 101. Merchant system 101 may then provide proxy code 310 to account issuer system 112 in a transaction request, under a merchant defined business as usual standard to facilitate completing the transaction (step 212). Account issuer system 112 may receive proxy code 310 and match it to the corresponding transaction account 112, which may be stored on account issuer database 114 (step 214). Account issuer system 112 may then provide to merchant system 101 the information, or funds to complete the transaction (step 216).

As used herein, the term "proxy code" may include any device, hardware, software, code, number, letter, symbol, digital certificate, smart chip, digital signal, analog signal, biometric and/or other identifier/indicia. A proxy code is issued via a network authorization message which includes a proxy number. The proxy number contains identifying information to identify the account holder and the specific merchant that issues payment requests. Proxy code 310 may also refer to any information provided to, for example, merchant system 101 during completion of a transaction request, which partially or fully masks the underlying sensitive information from merchant system 101. Particularly, the information provided to merchant system 101 (called "proxy code" herein) does not include sensitive information like, for example, transaction account number 312. Consequently, merchant system 101 is never provided the sensitive information since the sensitive information is not included in proxy code 310. Moreover, proxy code 310 may take the form of any conventional transaction account identifier. As such, when merchant system 101 receives proxy code 310, it may process proxy code 310 under business as usual standards. In this way, merchant system 101 is unaware that it has received a proxy code 310 and not the user's actual account number 312. Merchant system 101 may then store proxy code 310 in the place of the information ordinarily stored under conventional processing methods. Because proxy code 310 does not include sensitive information, no sensitive information may be stolen should merchant system 101 be compromised. In this way, account issuer system 112 may substantially eliminate, minimize or control the risks associated with merchant system 101 which may be compromised (e.g., fraudulent transactions, identity theft, etc.).

Another advantage of the present invention is that because proxy code 310 is permanently associated with a transaction account, proxy code 310 need never be modified on merchant system database 103. As such, the present invention eliminates the need to update information on merchant system 101 every time the related transaction device 102 is lost, stolen, or replaced. More particularly, the replacement device (not shown) is provided the identical proxy code 310 as was provided to the original transaction device 102. Consequently, merchant system 101 is provided the identical proxy code 310 in any instance where the user wishes to complete a transaction using the replacement transaction device which account issuer system 112 has permanently associated with the transaction account.

For example, merchant system 101 may receive proxy code 310 and store it in merchant database 103 relative to a user's recurring billing account such as a cellular telephone account. Periodically merchant system 101 may bill a transaction device 102 user in accordance with the telephone services provided. In accordance with invention device 102 user may wish to provide merchant system 101 with proxy code 310 for merchant system 101 to use to satisfy the bill. The user may authorize merchant system 101 to store proxy code 310 for repeated use in satisfying subsequent bills.

In a conventional recurring billing environment, the information received by merchant system 101 from transaction device 102 must ordinarily be updated when the user loses device 102 or device 102 information expires. That is, in conventional recurring billing environments the replacement device often is given device information which is often different from the information contained on the original transaction device 102. However, in accordance with the present invention, merchant system 101 need not update transaction device 102 information because proxy code 310 is permanently assigned with the transaction account.

In assigning proxy code 310, the issuer system 112 may correlate or match proxy code 310 to the account number 312 in, for example, a relational database (e.g., database structure 300). Referring again to FIG. 3, an exemplary account issuer database structure 300 of issuer database 114 (shown in FIG. 1) is shown. In exemplary structure 300, issuer system 112 may store proxy code 310 and account number 312 correlatively. Proxy code 310 and account number 312 may be stored in a separate database (not shown) or in a portion of database structure 300 designated for such storage (e.g., Account Number and Proxy Code portion 302). Issuer system 112 may additionally store the account holder's personal information 304 (e.g., name 314, address/phone number 316, etc.) and relevant account information (e.g., upper limit 318, account balance 320, account restrictions 322, etc.) corresponding to proxy code 310 and account number 312.

As noted above, the user's sensitive information relative to the user's account (account number 312, account holder's name 314, address 316, upper spending limit 318, account balance 320) is not provided to merchant system 101 during transaction completion. Instead, the user may only provide proxy code 310 to merchant system 101. The user provides proxy code 310 to merchant system 101 in a format similar to the account holder's account number 312. During settlement, issuer system 112 may receive proxy code 310 from merchant system 101 and correlate proxy code 310 to the user's account number 312 stored on issuer database 114. In an embodiment, issuer system 112 contains control logic stored thereon in order to retrieve from issuer database 114 account number 312 from issuer database 114 for use in settling the merchant's transaction request correlative to proxy code 310 for processing the merchant's transaction request. The control logic may be such that when issuer system 112 provides proxy code 310, issuer system 112 may request to receive corresponding account number 312 in return. For example, if issuer system 112 provides the control logic with proxy code 310 shown as "350864444444449" in FIG. 3, issuer system 112 will receive account number 312 shown as "370048693501255".

In one exemplary embodiment, account issuer system 112 may store proxy code 310 in a one-to-one relationship with account number 312. Alternatively, issuer system 112 may receive proxy code 310 and operate to convert it to a number correlated with transaction account number 312. Further still, account issuer system 112 may use any suitable correlation technique that is known which permits account issuer system 112 to receive one data and associate it with a second data. In other embodiments, proxy code 310 may be derived from account number 312 or any other data field, where proxy code 310 is stored, for example, in data fields on transaction device 102. Where proxy code 310 is accompanied by a secondary identifier, such as, for example, a personal identification number (PIN), issuer system 112 database may correlate or match proxy code 310, account number 312 and secondary identifier, so that issuer system 112 may reference any one of the numbers using any one of the other numbers. Issuer system 112 may use any conventional matching or storage protocol as is found in the art.

In one exemplary embodiment, issuer system 112 may assign distinct proxy codes for each transaction account issuer system 112 maintains. In which case, no two transaction accounts would be assigned identical proxy codes. For example, in FIG. 3, account number "370048693501235" may be assigned proxy code "35086444444449" while account number "370048655346465" may be assigned proxy code "350795555555559". In another exemplary embodiment, issuer system 112 may assign the same proxy code 310 to a plurality of transaction accounts, to multiple accounts related to the same cardholder, to multiple accounts controlled by the same entity (e.g., corporate card accounts), to all the transaction accounts issuer system 112 maintains or any other subset of accounts. Moreover, a proxy code 310 may not be a separate code; rather, proxy code 310 may be derived from a transaction device identifier or any other data. In another embodiment, proxy code 310 may be contained within another code or account number. In another embodiment, proxy code 310 is an encrypted or manipulated account number (or any other sensitive information). The same proxy code 310, an amended proxy code or an additional proxy code may also represent other sensitive data (aside from the account number), such as, for example, account holder name, address, biometric information, demographic information and/or the like. In this regard, merchant system 101 will not have access to this information, but account issuer system 112 may send this information related to proxy code 310 to acquirer 110 when acquirer 110 requires any portion of this information as part of its approval process.

Proxy code 310 may be populated onto a transaction device database (not shown). In other embodiments, the device may generate its own proxy code 310. In this embodiment, the user may download the generated proxy code 310 to issuer system 112 (e.g., via the Internet) prior to using proxy code 310 in a transaction. In another embodiment, reader 104 may generate a proxy code 310 prior to, during or after receiving sensitive information from transaction device 102. In this embodiment, reader 104 may delete the sensitive information, and only transmit proxy code 310 to merchant system 101 for transaction completion. Reader 104 may generate a proxy code 310 using the sensitive information which may be encoded in merchant system 101 recognizable format (e.g., magnetic stripe format). Issuer system 112 may receive proxy code 310 and reconstruct the sensitive information from proxy code 310, using any suitable decoding method or algorithm.

While transaction device 102 may contain proxy code 310, in certain embodiments, transaction device 102 may also contain account number 312 and other sensitive data; however, transaction device 102 will only communicate proxy code 310 to reader 104.

In one exemplary embodiment, proxy code 310 is configured in magnetic stripe format. That is, proxy code 310 may be stored in the Track 1/Track 2 portions of the magnetic stripe track network. Proxy code 310 may be uploaded onto a transaction device 102 which account issuer system 112 has assigned to a user. Proxy code 310 may be uploaded into a transaction device database in magnetic stripe format, and may also be transmitted to merchant system 101 in similar magnetic stripe format. A suitable method for providing proxy code 310 to transaction device 102 may be determined by transaction device 102 configuration. Proxy code 310 may be uploaded into a database or other storage area contained on transaction device 102, by populating proxy code 310 on the database using any conventional method. A suitable method is described in commonly owned U.S. patent application Ser. No. 10/192,488, entitled "SYSTEM AND METHOD FOR RFID PAYMENT USING RADIO FREQUENCY IDENTIFICATION IN CONTACT AND CONTACTLESS TRANSACTIONS," incorporated herein by reference. Once proxy code 310 is uploaded into the transaction device database, transaction device 102 may be used for transaction completion.

Once proxy code 310 is assigned and loaded on transaction device 102, proxy code 310 may be provided during the execution of a transaction in lieu of the actual transaction account number 312. In this way, proxy code 310 masks the actual account number 312 from merchant system 101 and from potential theft if merchant system 101 security is compromised. That is, instead of merchant system 101 storing account number 312 for later reference, merchant system 101 stores proxy code 310.

As noted, in one exemplary embodiment, proxy code 310 is formatted to mimic conventional transaction device sensitive information, such as an account number 312. Because proxy code 310 mimics an account number 312 proxy code 310 is configured in a format recognizable to merchant system 101. In this way, merchant system 101 is unaware that it is receiving proxy code 310 instead of the actual account number 312. For example, where the actual account number 312 is a credit card number, proxy code 310 would be configured to take the form of a valid credit card number. Similarly, where the actual account number 312 is a loyalty number, proxy code 310 is configured in a format similar to a valid loyalty number. In either case, however, proxy code 310 may contain no or minimal sensitive information related to the user account. Because proxy code 310 is in the same format as the account number or other sensitive data, merchant system 101 recognizes the information as valid data for the respective field. Merchant system 101 may then provide the transaction request to an acquirer 110 via a network 108 for transaction request completion. Acquirer 10 and/or issuer 112 can authorize the transaction request.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. In addition, the steps recited in any of the method or process claims may be executed in any order and are not limited to the order presented or method steps may be added or eliminated as desired. Further, the present invention may be practiced using one or more servers, as necessary. Thus, the preceding detailed description is presented for purposes of illustration only and not of limitation, and the scope of the invention is defined by the preceding description, and with respect to the attached claims.

What is claimed is:

1. A method comprising:
receiving, by a computer for securely completing a transaction, a proxy code from a transaction device, wherein said transaction device generates multiple proxy codes, including said proxy code and wherein said proxy code originates at said transaction device, wherein said transaction device generates said proxy code prior to said transaction, and wherein said computer comprises a non-transitory memory and a processor;
associating, by said computer, said proxy code to one of multiple transaction account codes, wherein said proxy code is provided to a merchant system for transaction completion, wherein said proxy code is absent of sensitive information, and includes a similar format as said one of multiple transaction account codes, wherein said multiple transaction account codes and user personal information include sensitive information;
receiving, by said computer, from said merchant system a transaction request, said transaction request including said proxy code;
locating, by said computer, said one of multiple transaction account codes associated with said proxy code;
locating, by said computer, a transaction account using said one of multiple transaction account codes; and
processing, by said computer, said transaction request in accordance with said transaction account.

2. The method of claim 1, further comprising assigning, by said computer, said transaction account to a user according to said user personal information.

3. The method of claim 1, further comprising assigning, by said computer, a transaction account code of said multiple transaction account codes to said transaction account.

4. The method of claim 1, further comprising associating, by said computer, said proxy code to said sensitive information stored in a database.

5. The method of claim 1, further comprising, by said computer, holding said proxy code fixed and altering said sensitive information to form altered sensitive information, and associating said altered sensitive information to said proxy code in said database.

6. The method of claim 1, wherein said locating said one of multiple transaction account codes includes generating said one of multiple transaction account codes from said proxy code.

7. The method of claim 1, further comprising associating, by said computer, said proxy code with a secondary form of identification for use in validating said proxy code.

8. The method of claim 1, wherein said proxy code is presented to said merchant system in an ISO 7816 magnetic stripe compatible format.

9. The method of claim 1, wherein said transaction device is operable to present said proxy code to said merchant system in a contactless environment.

10. The method of claim 1, wherein said transaction device is operable to present said proxy code to said merchant system via radio frequency identification (RFID) technology.

11. The method of claim 1, wherein said transaction device is configured to interface with a transponder/reader system comprising:

a Radio Frequency Identification (RFID) reader configured to provide a first radio frequency (RF) interrogation signal for powering a transponder system, to receive a transponder system RF signal, and to communicate transponder system account data related to said transponder system RF signal to a merchant system, said RFID reader including, a first interrogator for providing said first RF interrogation signal;

an RFID reader authentication circuit in communication with said first interrogator for authenticating said transponder system RF signal;

an RFID reader database for storing RFID reader data, said RFID reader database in communication with said RFID reader authentication circuit;

an RFID reader protocol/sequence controller in communication with at least one of said first interrogator, said RFID reader authentication circuit, and said RFID reader database, said RFID reader protocol/sequence controller configured to facilitate control of an order of operation of said first interrogator, said RFID reader authentication circuit, and said RFID reader database;

an RFID reader communications interface configured to communicate with said merchant system, said RFID reader communications interface configured to provide said transponder system account data, wherein said transponder system is configured to receive said first RF interrogation signal, to authenticate said first RF interrogation signal, and to transmit said transponder system account data, said transponder system further comprising: a first transponder responsive to said first RF interrogation signal;

a transponder system authentication circuit in communication with said first transponder, said transponder system authentication circuit configured to authenticate said first RF interrogation signal;

a transponder system database for storing said transponder system account data, said transponder system database in communication with said transponder system authentication circuit; and a transponder system protocol/sequence controller in communication with at least one of said first transponder, said transponder system authentication circuit, and said transponder system database, said transponder system protocol/sequence controller configured to control the order of operation of said first transponder, said transponder system authentication circuit, and said transponder system database, wherein said transponder system protocol/sequence controller is configured to activate said transponder system authentication circuit in response to said first RF interrogation signal having an RFID reader authentication code, said transponder system authentication circuit configured to encrypt said RFID reader authentication code to provide an encrypted RFID reader authentication code, said transponder system authentication circuit configured to provide said encrypted RFID reader authentication code to said first transponder for providing to said RFID reader, wherein said RFID reader is configured to receive said encrypted RFID reader authentication code, and wherein said RFID reader protocol/sequence controller is configured to activate said RFID reader authentication circuit in response to said encrypted RFID reader authentication code, wherein said RFID reader database is configured to provide a transponder system decryption security key to said RFID reader authentication circuit in response to said encrypted RFID reader authentication code, said transponder system decryption security key for use in decrypting said encrypted RFID reader authentication code to form a decrypted RFID reader authentication code, said transponder system decryption security key provided to said RFID reader based on an unique transponder identification code, wherein said RFID reader authentication circuit is configured to compare said decrypted RFID reader authentication code and said RFID reader authentication code to determine whether a match exists, and wherein said RFID reader protocol/sequence controller is configured to activate said RFID reader communications interface where said RFID reader authentication circuit matches said decrypted RFID reader authentication code and said RFID reader authentication code.

12. A system for securely completing a transaction, said system comprising:

a network interface communicating with a memory;

said memory communicating with a processor for virtual mobile transactions; and said processor, when executing a computer program, performs operations comprising:

receiving, by said processor, a proxy code from a transaction device, wherein said transaction device generates multiple proxy codes, including said proxy code and wherein said proxy code originates at said transaction device;

associating, by said processor, said proxy code to one of multiple transaction account codes, wherein said proxy code is provided to a merchant system for transaction completion, wherein said proxy code is absent of sensitive information, and includes a similar format as said one of multiple transaction account codes, wherein said multiple transaction account codes and user personal information include sensitive information;

receiving from said merchant system a transaction request, by said processor, said transaction request including said proxy code;

locating, by said processor, said one of multiple transaction account codes associated with said proxy code;

locating, by said processor, a transaction account using said one of multiple transaction account codes; and processing, by said processor, said transaction request in accordance with said transaction account.

13. A non transitory computer-readable storage medium having computer-executable instructions stored thereon that, if executed by a virtual mobile transactions computer, causes the computer to perform operations, comprising:

receiving, by said computer, a proxy code from a transaction device, wherein said transaction device generates multiple proxy codes, including said proxy code and wherein said proxy code originates at said transaction device, wherein said computer comprises a non transitory memory and a processor;

associating, by said computer, said proxy code to one of multiple transaction account codes, wherein said proxy code is provided to a merchant system for transaction completion, wherein said proxy code is absent of sensitive information, and includes a similar format as said one of multiple transaction account codes, wherein said multiple transaction account codes and user personal information include sensitive information;

receiving, by said computer, from said merchant system a transaction request, said transaction request including said proxy code;

locating, by said computer, said one of multiple transaction account codes associated with said proxy code;

locating, by said computer, a transaction account using said one of multiple transaction account codes; and processing, by said computer, said transaction request in accordance with said transaction account.

14. The system of claim 12, wherein said transaction device generates said proxy code prior to said transaction.

15. The medium of claim 14, wherein said transaction device generates said proxy code prior to said transaction.

* * * * *

UNITED STATES PATENT AND TRADEMARK OFFICE
CERTIFICATE OF CORRECTION

PATENT NO. : 8,418,918 B2  
APPLICATION NO. : 12/354539  
DATED : April 16, 2013  
INVENTOR(S) : Saunders et al.

Page 1 of 1

It is certified that error appears in the above-identified patent and that said Letters Patent is hereby corrected as shown below:

In the Claims

In Column 19 Line 7, Claim 15, please delete "14" and insert therefor --13--.

Signed and Sealed this
Twenty-fourth Day of December, 2013

Margaret A. Focarino
*Commissioner for Patents of the United States Patent and Trademark Office*